United States Patent [19]

Mineyama et al.

[11] Patent Number: 5,414,315
[45] Date of Patent: May 9, 1995

[54] WATER DRAINING STRUCTURE FOR MOTORS

[75] Inventors: Katsumi Mineyama, Obu; Masaki Kushida, Toyota; Masayuki Nishiguchi, Aichi, all of Japan

[73] Assignee: Aisan Kogyo Kabushiki Kaisha, Obu, Japan

[21] Appl. No.: 144,359

[22] Filed: Nov. 1, 1993

[30] Foreign Application Priority Data

Nov. 5, 1992 [JP] Japan .................. 4-296154

[51] Int. Cl.$^6$ ................... H02K 5/10; H02K 5/00
[52] U.S. Cl. ......................................... 310/88; 310/89
[58] Field of Search .................. 310/88, 89; 361/689, 361/699, 724; 312/229; 174/67

[56] References Cited

U.S. PATENT DOCUMENTS

| | | | |
|---|---|---|---|
| 2,514,001 | 7/1950 | Knuth | 312/229 |
| 4,846,537 | 7/1989 | Cohn et al. | 312/229 |
| 5,077,503 | 12/1991 | Tamura et al. | 310/88 |
| 5,111,497 | 5/1992 | Bliven et al. | 361/683 |
| 5,134,541 | 7/1992 | Frouin | 361/622 |

FOREIGN PATENT DOCUMENTS 314147 12/1988 Japan ................... 310/88
1131456 6/1973 United Kingdom ........... 310/88

*Primary Examiner*—Thomas M. Dougherty
*Assistant Examiner*—Clayton E. LaBalle
*Attorney, Agent, or Firm*—Nikaido, Marmelstein, Murray & Oram

[57] ABSTRACT

A water draining structure for a built-in type motor to be integrally mounted on an automotive throttle body, having a mounting member including a housing of a driven device and having a confined chamber formed between itself and a motor mounted integrally thereon, and a water draining hole formed in its bottom for providing communication between the chamber and the atmosphere. The water draining structure consists of at least one water cutting rib disposed in close proximity to the water draining hole and projected outward from the shell of the mounting member. Water having splashed on the motor or the mounting member can be cut by the water cutting rib so that an excellent drainage can be always retained while keeping the water draining hole vented to the atmosphere. As a result, the motor can be prevented from having its function decreased even if it is used under a sever environmental condition, so that its durability can be effectively improved.

2 Claims, 5 Drawing Sheets

WATER DRAINING STRUCTURE FOR MOTORS

BACKGROUND OF THE INVENTION (1) Field of the Invention

The present invention relates to a water draining structure for a built-in type motor to be integrally mounted on an automotive throttle body, for example.

(2) Description of the Prior Art

Generally speaking, if water and/or steam (as will be shortly referred to as "water") steals into a motor, it may be reserved in the motor without being drained to the outside and may rust the motor components such as a rotor or a stator to deteriorate the motor functions.

Thus, one of us has proposed, in Japanese Utility Model Laid-Open No. 34854/1989, a water draining structure for a motor, in which a confined chamber is formed between a mounting member such as a housing of a driven device and the motor, in which communication between the motor inside and the chamber is established through a water draining communication hole and an air vent hole, and in which the chamber has its bottom portion formed with a water draining hole vented to the atmosphere.

In case, however, the automobile runs in puddles or the like to have its mounting member or motor splashed with water, its water draining hole may have its opening closed from the atmosphere. More specifically, the water will flow down, if having splashed the mounting member or the motor, along the outer side faces 51a of the mounting member 51, as indicated by solid arrows in FIG. 1. As indicated by broken arrows, moreover, the water will partially invade into a chamber 53 along the mounting face 52 of the mounting member 51, on which is mounted the motor. The water will flow into water draining holes 54 and 55 until it is drained into the atmosphere from the bottom openings of the holes 54 and 55.

On the other hand, the water having flowed down along the outer side faces of the mounting member 51 may flow around the bottom face and plug the openings of the holes 54 and 55 and may deteriorate its drainage from the space 53 out of the water draining holes 54 and 55.

SUMMARY OF THE INVENTION

The present invention has been conceived to solve the above-specified problem and has an object to provide a water draining structure for a motor, which can maintain an excellent drainage even if splashed with much water.

In order to achieve the above-specified object, according to the present invention, there is provided a water draining structure for a motor, in which a confined chamber is formed between a mounting member such as a housing of a driven device and a motor integrally mounted the mounting member, and in which said mounting member has its bottom portion formed with a water draining hole for providing communication between said chamber and the atmosphere, wherein the improvement resides in that said mounting member includes a water cutting rib for cutting off flow of water, disposed in close proximity to said water draining hole and projected outward of the shell of said mounting member.

According to the aforementioned structure of the present invention, in case the motor or the driven member is splashed with water, the water having wet the mounting member flows down along the outer side faces of the mounting member and is guided outward by the water cutting rib so that it is cut down at the leading end portion of the rib. As a result, the water draining hole can be prevented from being plugged with the water, which might otherwise flow around to the bottom face, to keep the chamber vented to the atmosphere.

According to the water draining structure for a motor according to the present invention, as described above, the water can be cut, even if seriously having splashed the motor or the mounting member, by the water cutting rib so that an excellent drainage can be always retained while keeping the water draining hole vented to the atmosphere.

As a result, the motor can be prevented from having its function decreased, even if it is used under a severe environmental condition, so that its durability can be effectively improved.

DESCRIPTION OF THE PREFERRED EMBODIMENTS

Figure 1:
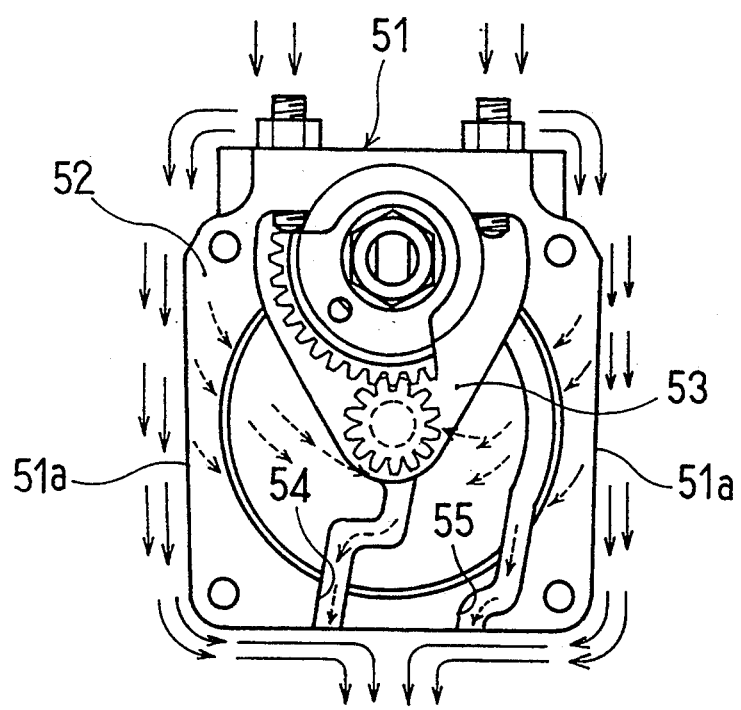
FIG. 1 is a front elevation showing a flow pattern of water splashed on the mounting member of the prior art.
Figure 2:
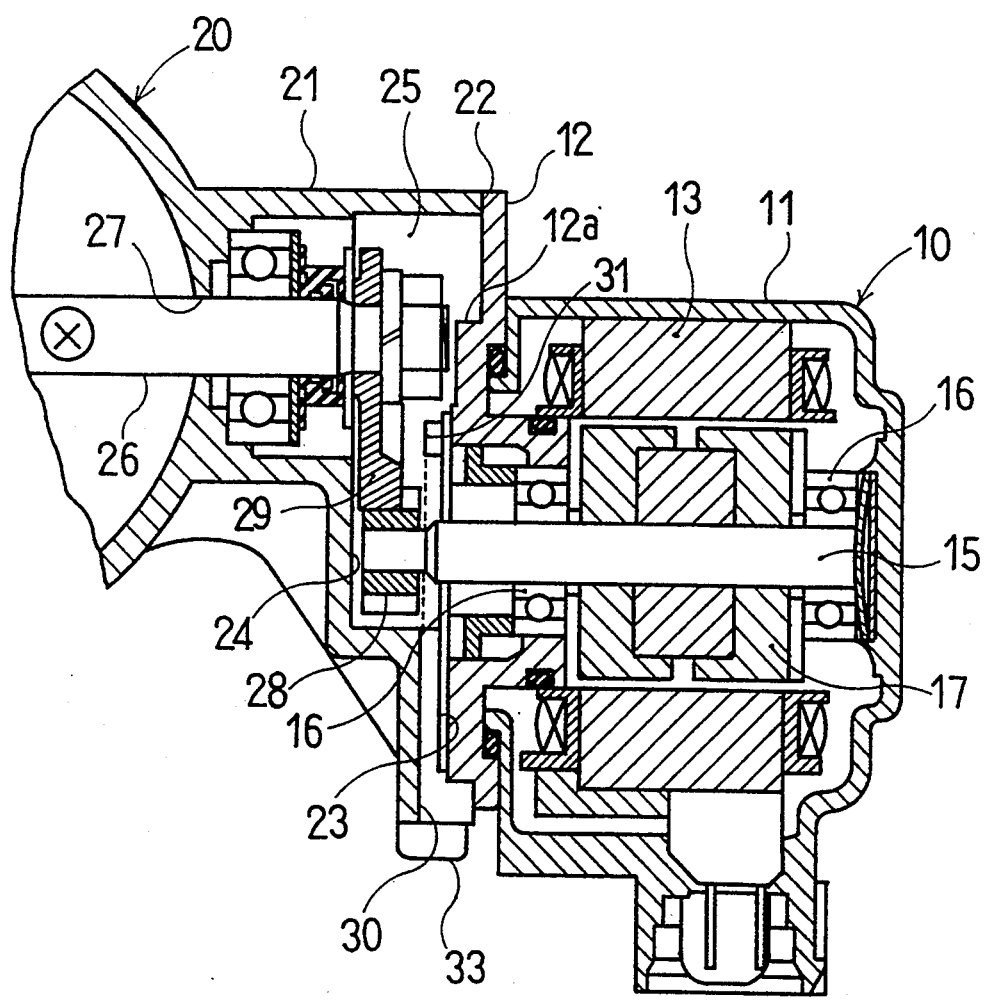
FIG. 2 is a sectional side elevation showing a water draining structure for a motor according to a first embodiment of the present invention.
Figure 3:
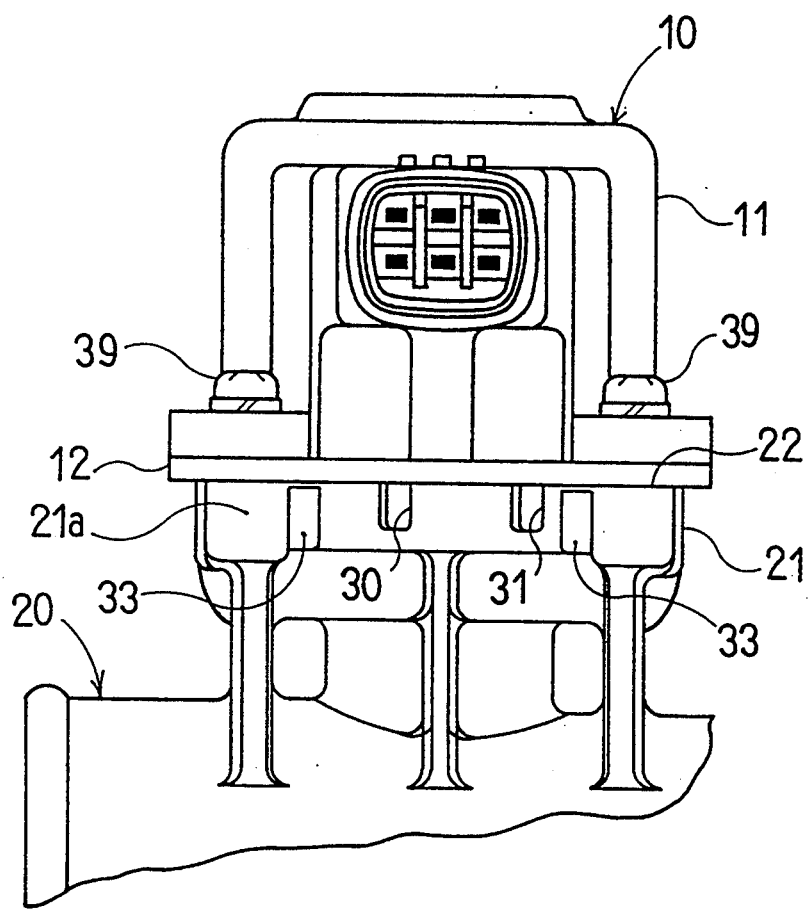
FIG. 3 is a bottom view of the same water draining structure.
Figure 4:
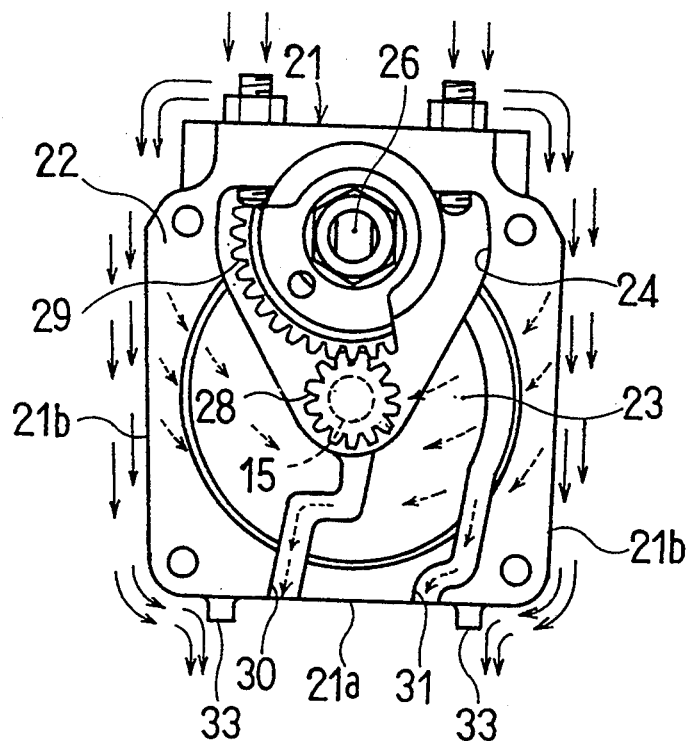
FIG. 4 is a front elevation showing a mounting member of the same.

FIG. 2 is a sectional side elevation showing a motor and a mounting member having a water draining structure for a motor according to one embodiment of the present invention; FIG. 3 is a bottom view showing the same; and FIG. 4 is a front elevation showing the mounting member.

First of all, one example of the motor to be integrally mounted on the mounting member of a driven device will be described with reference to FIG. 2.

A motor 10 has its shell formed of a casing 11 and an end cover 12 and is constructed to include: a stator fitted in the casing 11 and composed of a stator core and a stator coil; an output shaft 15 rotatably borne on bearings 16 and 16; and a rotor 17 composed of a rotor core and a permanent magnet mounted on the output shaft 15.

Moreover, the output shaft 15 has its one end protruded outward through the end cover 12, which has its outer face formed with a circular stepped portion 12a.

Next, water draining holes will be described with reference to FIGS. 2 to 4.

The end cover 12 of the motor 10 is integrally mounted on the mounting face 22 of a mounting member 21 of a housing 20 of the throttle body of a driven device by means bolts 39. Incidentally, the motor 10 is mounted to have its output shaft 15 positioned generally horizontally with respect to the mounting member 21.

The mounting face 22 of the mounting member 21 is formed with a recess which is made continuous by a circular recess 23 for fitting the stepped portion 12a and a recess for accommodating a later-described gear mechanism. On the other hand, the mounting face 22 is formed with channel-shaped water draining holes 30 and 31 which lead from the recess 24 to the bottom face 21a of the mounting member 21 through the circular recess 23. Moreover, when the motor 10 is mounted on the mounting member 21, a confined chamber 25 is formed by the circular recess 23 and the recess 24, and the water draining holes 30 and 31 are opened in the bottom face 21a.

In the recess 24 of the chamber 25, there is accommodated the gear mechanism which associates the output shaft 15 of the motor 10 and a driven shaft 26 corresponding to the valve shaft of the throttle body. In other words, the output shaft 15 has its one end portion projected into the chamber 25 to fix a drive gear 28 at its extension.

On the other hand, the driven shaft 26 has its one end portion projected into the chamber 25 through a shaft hole 27 to fix a driven gear 29 meshing with the drive gear 28 at its extension. As a result, the driving force of the motor 10 is transmitted to the driven shaft 26 of the driven device through the gear mechanism composed of the gears 28 and 29.

Here will be described the water draining structure.

As shown in FIGS. 3 and 4, the mounting member 21 has its bottom face 21a formed, at the lefthand side of the water draining hole 30 and at the righthand side of the water draining hole 31, with water cutting ribs 33 which are projected downward while having a generally rectangular transverse section and a length substantially equal to that of the bottom face 21a.

In the water draining structure for the motor thus constructed, in case the motor 10 and the mounting member 21 are splashed with water, this water flows down, as indicated by solid arrows in FIG. 4, along the outer side faces 21b of the motor 10 and the mounting member 21. Then, the water having flowed around from the side faces 21b to the bottom face 21a arrives at the water cutting ribs 33 and 33 so that it is turned downward by the ribs 33 and is dripped and cut by the lower end portions of the ribs 33. This prevents the openings of the water draining holes 30 and 31 from being plugged with the water which might otherwise flow around to the bottom face 21a.

Even if, on the other hand, the water should invade into the chamber 25 along the mounting face 22, it is promptly drained to the outside from the chamber 25 through the water draining holes 30 and 31 as indicated by broken arrows in FIG. 4. At this time, the water draining holes 30 and 31 are also prevented from being plugged with the water which might otherwise flow around to the bottom face 21a along the side faces 21b.

Figure 5:
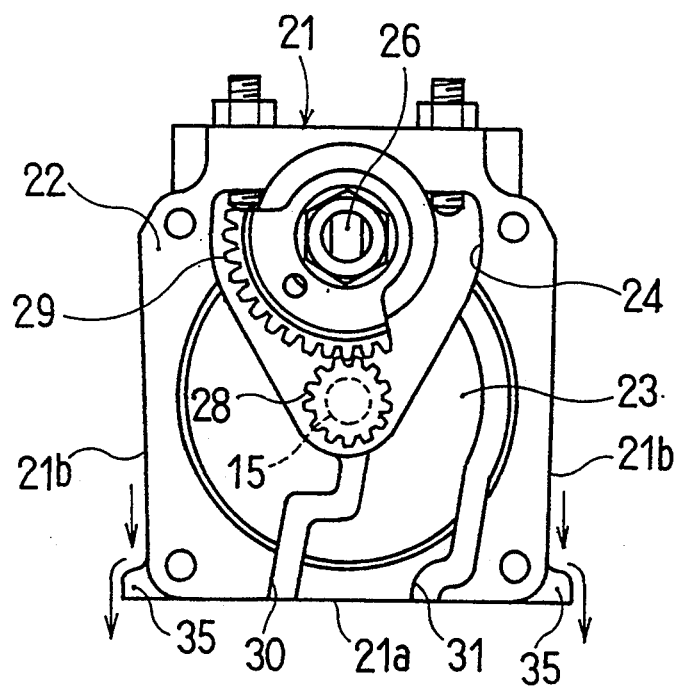
FIG. 5 is a front elevation showing a mounting member having water cutting ribs according to a second embodiment.

FIG. 5 shows another embodiment of the present invention, which is characterized in the arrangement of the water cutting ribs. Incidentally, the portions common to the first embodiment are designated by the identical reference numerals and will not be described again in the following. In this second embodiment, water cutting ribs 35 and 35 are formed on the lower end portions of the lefthand and righthand side faces 21b of the mounting member 21 such that they are projected leftward and rightward while having a generally rectangular transverse section. As a result, the water is cut and dripped, if any having flowed down along the side faces 21b of the mounting member 21, by the leading end portions of the water cutting ribs 35 and 35. Thus, the water draining holes 30 and 31 opened in the bottom face 21a can also be vented to the atmosphere at all times.

Figure 6:
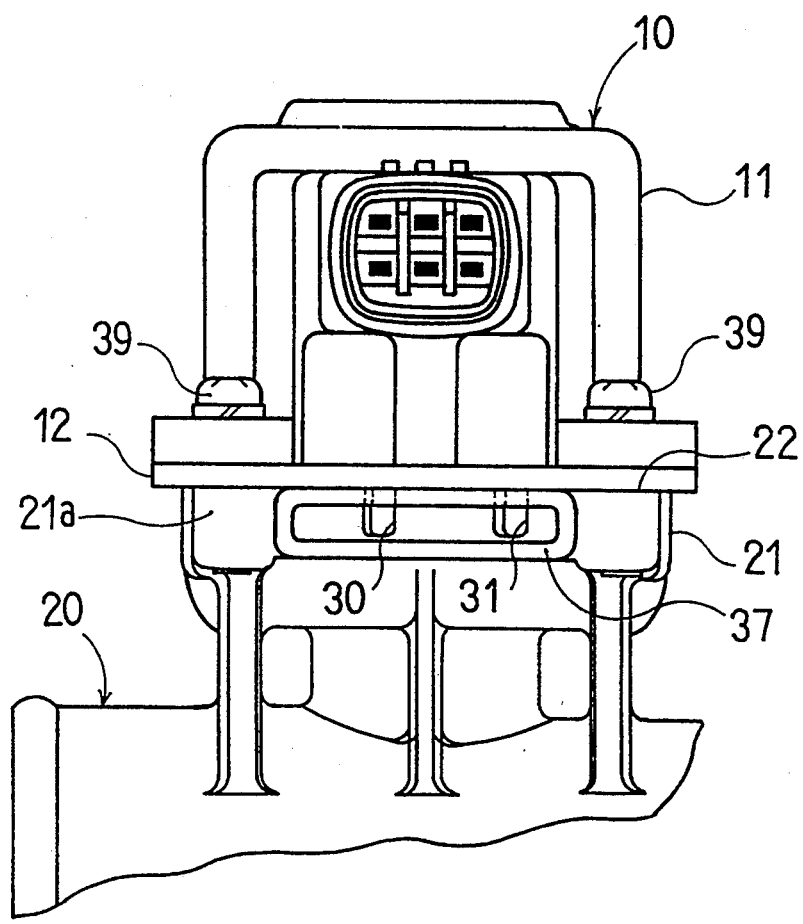
FIG. 6 is a bottom view showing a mounting member having a water cutting rib according to a third embodiment.

FIG. 6 shows a third embodiment of the present invention, which is characterized in that a water cutting rib is formed to surround the water draining holes.

In this third embodiment, the water cutting rib 37 having a generally rectangular transverse section is projected downward while surrounding the water draining holes 30 and 31 which are opened in the bottom face 21a of the mounting member 21.

As a result, the water cutting rib 37 blocks the flow of water, which comes from not only the side faces 21b of the mounting member 21 but also the housing 20 of the throttle body and the motor 10, and drips and cuts the water to keep the water draining holes 30 and 31 vented to the atmosphere.

Incidentally, the present invention should not be limited to the foregoing description and the shown embodiments but can be modified in its modes without departing from the technical concept thereof. For example, the transverse section of the water cutting rib or ribs may be freely exemplified by any shape such as a semicircular, triangular or trapezoidal shape if it can retain its water cutting action.

Moreover, the driving device may include a variety of devices to be driven by a motor, in addition to that throttle body. Still moreover, the mounting member is conceived to include a body, a casing or a bracket in addition to the housing of the driven device.

Furthermore, no limitation should be given to the type and structure of the motor.

What is claimed is:

1. A water draining structure for a motor comprising a mounting member including a housing of a driven device and a casing attached thereto forming a confined chamber for a motor mounted on said mounting member, the casing having a water draining hole formed in a bottom surface thereof for providing communication between inside and outside of said confined chamber, said water draining structure comprising:

at least one water cutting rib for cutting off flow of water along outside surfaces of said casing to prevent such water from reaching said water draining hole in the bottom surface, said water cutting rib projecting outwardly from a surface of said casing in close proximity to said water draining hole and being formed such that water flowing on said casing surface to said water cutting rib will drip from said casing before entering said water draining hole;

wherein water cutting ribs are formed on the bottom surface of said casing at each of two opposed sides of said water draining hole, said ribs projecting downwardly between said water draining hole and respective side surfaces of said casing.

2. A water draining structure for a motor comprising a mounting member including a housing of a driven device and a casing attached thereto forming a confined chamber for a motor mounted on said mounting member, the casing having a water draining hole formed in a bottom surface thereof for providing communication between inside and outside of said confined chamber, said water draining structure comprising:

at least one water cutting rib for cutting off flow of water along outside surfaces of said casing to prevent such water from reaching said water draining hole in the bottom surface, said water cutting rib projecting outwardly from a surface of said casing in close proximity to said water draining hole and being formed such that water flowing on said casing surface to said water cutting rib will drip from said casing before entering said water draining hole;

wherein said water cutting rib is formed on said bottom surface of said casing surrounding said water draining hole and projecting downwardly.

* * * * *